(12) United States Patent
Czachor, Jr. et al.

(10) Patent No.: US 12,556,636 B2
(45) Date of Patent: Feb. 17, 2026

(54) SYSTEM AND METHOD FOR ENSURING ACTIVATION OF CALL FORWARDING TO ANSWERING SERVICE OR THE LIKE

(71) Applicant: ASD Inc., a Pennsylvania Corporation, Media, PA (US)

(72) Inventors: Martin Czachor, Jr., Newtown Square, PA (US); Jessica Czachor, Newtown Square, PA (US); Kevin Czachor, West Chester, PA (US); Norman Franke, Garnet Valley, PA (US)

(73) Assignee: ASD Inc., a Pennsylvania Corporation, Media, PA (US)

( * ) Notice: Subject to any disclaimer, the term of this patent is extended or adjusted under 35 U.S.C. 154(b) by 492 days.

(21) Appl. No.: 18/197,437

(22) Filed: May 15, 2023

(65) Prior Publication Data
US 2024/0388658 A1 Nov. 21, 2024

(51) Int. Cl.
*H04M 3/00* (2024.01)
*H04M 3/54* (2006.01)

(52) U.S. Cl.
CPC ........... *H04M 3/543* (2013.01); *H04M 3/541* (2013.01)

(58) Field of Classification Search
CPC .............................. H04M 3/543; H04M 3/541
See application file for complete search history.

(56) References Cited

U.S. PATENT DOCUMENTS

| | | | |
|---|---|---|---|
| 8,467,515 B2 * | 6/2013 | Czachor, Jr. | H04M 3/5235 379/214.01 |
| 8,498,399 B2 | 7/2013 | Czachor, Jr. et al. | |
| 8,548,149 B2 | 10/2013 | Czachor, Jr. et al. | |
| 8,929,535 B1 | 1/2015 | Czachor, Jr. et al. | |
| 9,094,514 B2 | 7/2015 | Czachor, Jr. et al. | |
| 9,100,271 B2 * | 8/2015 | Yang | H04L 12/5692 |
| 9,300,800 B2 | 3/2016 | Czachor, Jr. et al. | |
| 9,584,663 B2 | 2/2017 | Czachor, Jr. et al. | |
| 10,165,112 B2 | 12/2018 | Czachor, Jr. et al. | |
| 10,165,120 B2 | 12/2018 | Czachor, Jr. et al. | |
| 10,212,281 B2 | 2/2019 | Czachor, Jr. et al. | |
| 10,334,105 B1 | 6/2019 | Czachor, Jr. et al. | |
| 10,812,657 B1 * | 10/2020 | Czachor, Jr. | H04M 3/5232 |
| 11,070,668 B2 * | 7/2021 | Synal | H04M 3/2218 |
| 11,546,741 B2 * | 1/2023 | Chu | H04M 3/42059 |
| 2012/0321064 A1 * | 12/2012 | Czachor, Jr. | H04M 3/436 379/210.02 |
| 2024/0388658 A1 * | 11/2024 | Czachor, Jr. | H04M 3/543 |

* cited by examiner

*Primary Examiner* — Pakee Fang
(74) *Attorney, Agent, or Firm* — Steven H. Meyer, Esq.

(57) ABSTRACT

A called party is expected to activate call forwarding to an answering service when going off duty. In an attempt to ensure that call forwarding is activated, the answering service creates a check record for the called party in a database, including a call time at which to effectuate a check call. The call record is taken up at the call time thereof and is employed to place the check call. The placed check call presumptively occurs after the called party has gone off duty and activated call forwarding. A determination is made of whether the check call automatically forwarded to the answering service. If so, the called party in fact activated call forwarding, and the check record is marked as completed. If not, the called party did not in fact activate call forwarding, and the check record is updated accordingly.

19 Claims, 4 Drawing Sheets

SYSTEM AND METHOD FOR ENSURING ACTIVATION OF CALL FORWARDING TO ANSWERING SERVICE OR THE LIKE

FIELD

The present disclosure relates to a business organization or the like that provides answering services, such as answering services for professionals such as doctors, lawyers, funeral directors, servicing representatives, and the like. More particularly, the present disclosure relates to such a business organization that provides such answering services in response to calls forwarded thereto from the professional. In particular, the present disclosure relates to the business organization taking positive actions to ensure that the calls of the professional are forwarded by automatically reminding the professional that a call forwarding service for the professional is not activated at a time when the professional is presumptively not available.

BACKGROUND

In many business- or professional-related situations or the like, an age-old and recurring problem is effectuating contact between a professional or the like and a caller or the like calling or otherwise attempting to contact the professional. Perhaps ideally, the caller would place a telephone call or the like to the professional, the professional would answer the placed telephone call instantaneously if not within a matter of moments, the desired contact would thus be established, and the caller and professional could communicate regarding some matter of interest. Notably, however, most professionals are not always available to answer all calls instantaneously or even momentarily. For example, the professional simply may not want to answer calls, such as for example if on a vacation or at a family event, among other things, or the professional may be otherwise occupied by professional matters. Likewise, the professional may work a regular daily schedule, such as for example from 9 AM to 5 PM on Monday through Friday, and outside of the regular schedule the professional may not wish to be disturbed, at least under normal circumstances.

With regard to the professional working the regular schedule, it may be that a doctor is working during the day and does not wish to be disturbed at night, except for emergencies. Likewise, it may be that a building superintendent only works evenings and weekends, and otherwise does not wish to be disturbed about building matters unless necessary. In a similar manner, a funeral director may directly attend to funeral clients during normal business hours, but does not wish to do so after hours unless a funeral client is calling in as an initial matter to initiate planning for a funeral.

Generally, it is to be recognized that a professional or the like may not always be immediately available to answer a call from a caller, be it to a landline telephone line or a mobile telephone line or to another communications device which may be available. As should be appreciated, such a situation can exist even when the caller is calling regarding an urgent matter, such as a life-threatening matter or a matter that otherwise should be given immediate attention. Accordingly, it is known that such a professional may employ a business organization that provides answering services or the like (hereinafter, 'an answering service') to answer calls from callers when the professional is not immediately available.

As should be understood, a call to the professional is forwarded therefrom to the answering service by appropriate means when the professional is not available to answer such call or the like, and the answering service may perform a range of answering duties on behalf of the professional. Such call forwarding may be achieved on a per-call basis, such as for example if the professionally positively directs that a particular call be forwarded by way of a prearranged actuation procedure, or may be achieved automatically for all calls, such as for example if the professional has activated automatic call forwarding for all calls by way of a prearranged enabling procedure.

In any event, upon answering a forwarded call on behalf of the professional, the answering service may let the caller know when the professional is scheduled to be available, or may collect information so that the professional can return the call at an opportune time. Likewise, the answering service may perform an assessment regarding the nature of the call and based thereon may perform a range of actions. Thus, the answering service may determine that a relatively more serious matter requires more immediate action from the professional, in which case the answering service may attempt to contact the professional as soon as possible by appropriate means. Correspondingly, the answering service may determine that a relatively less serious matter requires less immediate action from the professional, in which case the answering service may only create a message for the professional to be collected thereby at a later time.

Particularly with regard to funeral directors and the special needs thereof, funeral answering services and the like have been developed to focus on and address same. Moreover, it should be understood that such funeral answering services are employed not only by funeral directors, but also by other funeral professionals that require similar heightened levels of dignity, caring, and compassion in their answering service needs. Such other funeral professionals may for example include funeral homes, cremation services, crematory facilities, cemetery and memorial parks, casket and coffin companies, livery services, trade embalmers, funeral transport services, coroners, monument companies, burial vault companies, grief and bereavement counselors, body and tissue donation services, pet cremation, burial and cemetery services, and the like.

Typically, upon a funeral business or the like engaging an answering service to answer calls to the funeral business, the answering service or the funeral business engages the services of one or more telephone service providers or the like to effectuate forwarding of telephone calls or the like from the business to the answering service, particularly in a manner deemed necessary and/or advisable by the business. Such engaging and such forwarding services are generally known and need not be set forth herein in any detail other than that which is provided. Generally, the call forwarding may occur on any appropriate basis, including the time of day, whether call forwarding has been positively activated or deactivated, whether the business has selected a particular call for forwarding, whether a call has rung a predetermined number of times, whether a phone or phone system of the business is off, or the like.

Notably, the answering service may answer a call on behalf of a particular funeral business according to a predetermined procedure or 'script' that has been established for the particular funeral business. As may be appreciated, the script tends to cover a wide range of subjects, including the name and location of the deceased, the name, location, and telephone number of the caller, whether the caller is a family member or friend or a staff member at a nursing home or hospital or the like, where and when the funeral is to be performed, where and when burial or cremation is to be performed, required clergy, directions to establishments, parking availability and needs, handicap accessibility, available local florists and flower delivery services, and the like. In fact, such scripts can accommodate a wide range of scenarios and needs, and therefore can be quite extensive. Importantly, with the use of such a script, information can be collected from the funeral caller according to the script and entered into an appropriate database or the like for later retrieval and use, as is generally known.

It is to be understood that in at least some professional situations, an answering service acts not only to answer calls on behalf of a professional, but also acts as what likely is the first contact a caller encounters regarding a called professional. Thus, the answering service experience may be the source of the first impressions the caller forms with regard to the professional. Put simply, if the caller forms a bad impression based on how the call is answered, the caller may also form a bad impression of the called professional, and perhaps may choose to forego employing the called professional in favor of another professional, among other things. In contradistinction, if the caller forms a good impression based on how the call is answered, the caller may also form a good impression of the called professional, and perhaps may choose to in fact employ the called professional, among other things.

Formation of such an impression by a caller is highly subjective, and may be expected to occur based on many factors. Perhaps most relevant in the present context, one important factor is whether the call is indeed forwarded and answered when the professional is unavailable. Put simply, the first way to lose a potentially new client is to not answer a call therefrom in an expeditious manner. Thus, in the particular circumstance where a professional is unavailable outside of a regular schedule thereof, it is to be appreciated that the professional may wish to ensure that the aforementioned call forwarding is activated at appropriate times. Thus, upon activation, all calls for the professional that would normally be received and answered at one or more call-receiving devices of the professional are instead automatically forwarded to the answering service for answering and processing thereat.

An issue arises, however, in that a professional normally must manually activate the automatic call forwarding of calls therefor to the answering service for answering thereat. Such manual activation is generally known or should be apparent, and typically requires some sort of enabling procedure such as entry of an enabling code or pressing of an enabling button on a device of the professional. Customarily, the professional performs such enabling procedure for manual activation of the automatic call forwarding when the professional goes off duty or the like, and performs a corresponding disabling procedure for manual deactivation of the automatic call forwarding when the professional goes back on duty or the like. Critically, though, a professional may at times simply forget to perform the enabling procedure in particular. As may be appreciated, the result is that calls for the professional are not in fact automatically forwarded to the answering service for answering thereat, and opportunities to service callers may be missed.

Accordingly, a need exists for a system and method for ensuring activation of call forwarding from a professional or the like to an answering service or the like. In particular, a need exists for such a system and method where the answering service tests whether such call forwarding is activated and attempts to contact the professional when such call forwarding is not in fact activated. Further, a need exists for such a system and method where such answering service repeatedly attempts to contact the professional until the call forwarding is activated or the professional positively dismisses such attempts.

SUMMARY

A system and method are provided at an answering service that answers a call to a called party unable or unwilling to answer the call directly. The call is forwarded to the answering service by way of a call forwarding service of the called party (hereinafter, 'call forwarding'), and the called party is normally expected to activate call forwarding when the called party goes off duty. To at least attempt to ensure that call forwarding is activated after the called party goes off duty, a computing system of the answering service determines with reference to a database when the called party goes off duty, and creates a check record for the called party in the database. The check record includes a call time at which to effectuate a check call to a calling device of the called party to establish whether the called party has in fact activated call forwarding to the answering service with regard to such calling device. The call time in the call record corresponds to when the called party goes off duty.

The call record is taken up from the database at the call time thereof and is employed to place the check call to the called party at the calling device thereof. The placed check call presumptively occurs after the called party has gone off duty and after such called party has activated call forwarding with regard to the calling device. A determination is made of whether the check call to the device automatically forwarded to the answering service. If the check call did automatically forward to the answering service, the check call succeeded and the called party in fact activated call forwarding, and the check record is marked as completed. If the check call did not automatically forward to the answering service, the check call failed and the called party did not in fact activate call forwarding, and the check record is updated accordingly.

BRIEF DESCRIPTION OF THE DRAWINGS

The foregoing summary as well as the following detailed description of various embodiments of the present innovation will be better understood when read in conjunction with the appended drawings. For the purpose of illustrating the various embodiments of the innovation, there are shown in the drawings embodiments that are presently preferred. As should be understood, however, the innovation is not limited to the precise arrangements and instrumentalities shown. In the drawings.

DETAILED DESCRIPTION OF PREFERRED EMBODIMENTS

Figure 1:
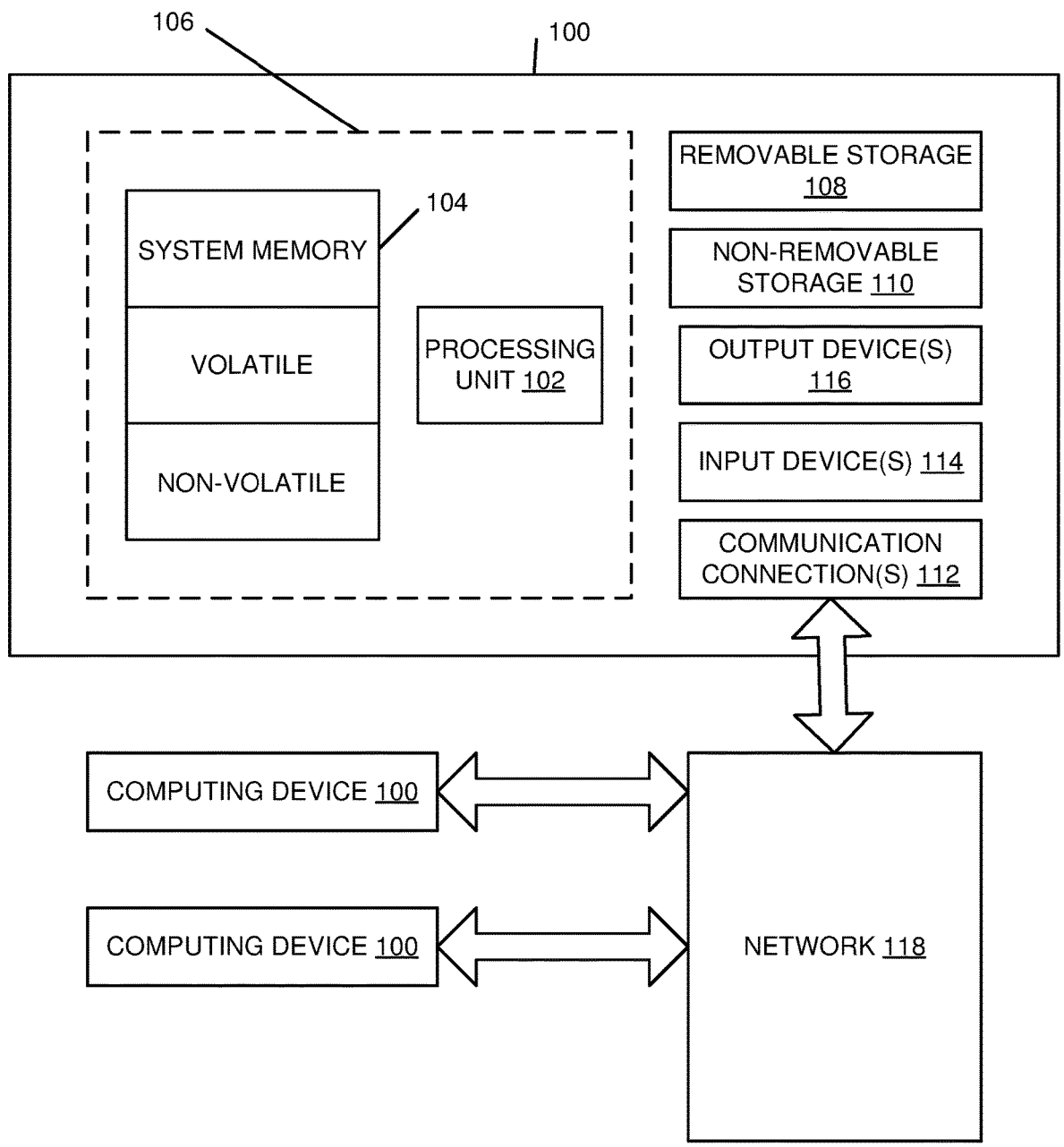
FIG. 1 is a block diagram of an example of a computing environment within which various embodiments of the present innovation may be implemented.

Certain terminology may be used in the following description for convenience only and is not limiting. The words "lower" and "upper" and "top" and "bottom" designate directions in the drawings to which reference is made. The terminology includes the words above specifically mentioned, derivatives thereof and words of similar import.

Where a term is provided in the singular, the inventors also contemplate aspects of the invention described by the plural of that term. As used in this specification and in the appended claims, the singular forms "a", "an" and "the" include plural references unless the context clearly dictates otherwise, e.g., "a tip" includes a plurality of tips. Thus, for example, a reference to "a method" includes one or more methods, and/or steps of the type described herein and/or which will become apparent to those persons skilled in the art upon reading this disclosure.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods, constructs and materials are now described. All publications mentioned herein are incorporated herein by reference in their entirety. Where there are discrepancies in terms and definitions used in references that are incorporated by reference, the terms used in this application shall have the definitions given herein.

Example Computing Environment

FIG. 1 is set forth herein as an exemplary computing environment in which various embodiments of the present invention may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, 'smart' phones, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 1 by dashed line 106. Computing device 100 may have additional features and functionality. For example, computing device 100 may include additional storage (removable and/or non-removable) including, but not limited to, magnetic or optical disks or tape. Such additional storage is illustrated in FIG. 1 by removable storage 108 and non-removable storage 110.

Computing device 100 typically includes or is provided with a variety of computer-readable hardware media. Computer-readable media can be any available media that can be accessed by computing device 100 and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other computer-readable hardware medium which can be used to store the desired information and which can be accessed by computing device 100. Any such computer storage media may be part of computing device 100.

Computing device 100 may also contain communications connection(s) 112 that allow the device to communicate with other devices 100. Each such communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection (including VoIP), and wireless media such as acoustic, radio frequency (RF), Wi-Fi, infrared and other wireless media. The term computer-readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, computing device 100 may be one of a plurality of computing devices 100 inter-connected by a network 118, as is shown in FIG. 1. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the Internet or the like. Likewise, the network 118 may be such an external network.

Particularly in the case where the network 118 is an external network, such network 118 may be a digitally based network (including VoIP) for exchanging computer data among the devices 100, may be an audio and/or video network for exchanging audio and/or video data among the devices 100, or the like. Thus, it may be that the network 118 may be a public switched telephone network for landline telephone communications, a mobile switching center for wireless telephone communications, a paging network for distributing paging information, a private multimedia network for establishing videoconferencing, or the like. Thus, it should be appreciated, that one or more of the computing devices 100 that are shown to the left of the network 118 in FIG. 1 may be a mobile telephone, a landline telephone, a pager, a mobile electronic mail device, a desktop electronic mail device, a mobile electronic texting device, a desktop electronic texting device, or a combination thereof, or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such a magnetic disk, an optical disk, a flash RAM drive, a locally accessible storage medium, a remotely accessible storage medium, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effectuated across a plurality of devices in a network 118. Such devices might include personal computers, network servers, and handheld devices, for example.

Professional Answering Service

Figure 2:
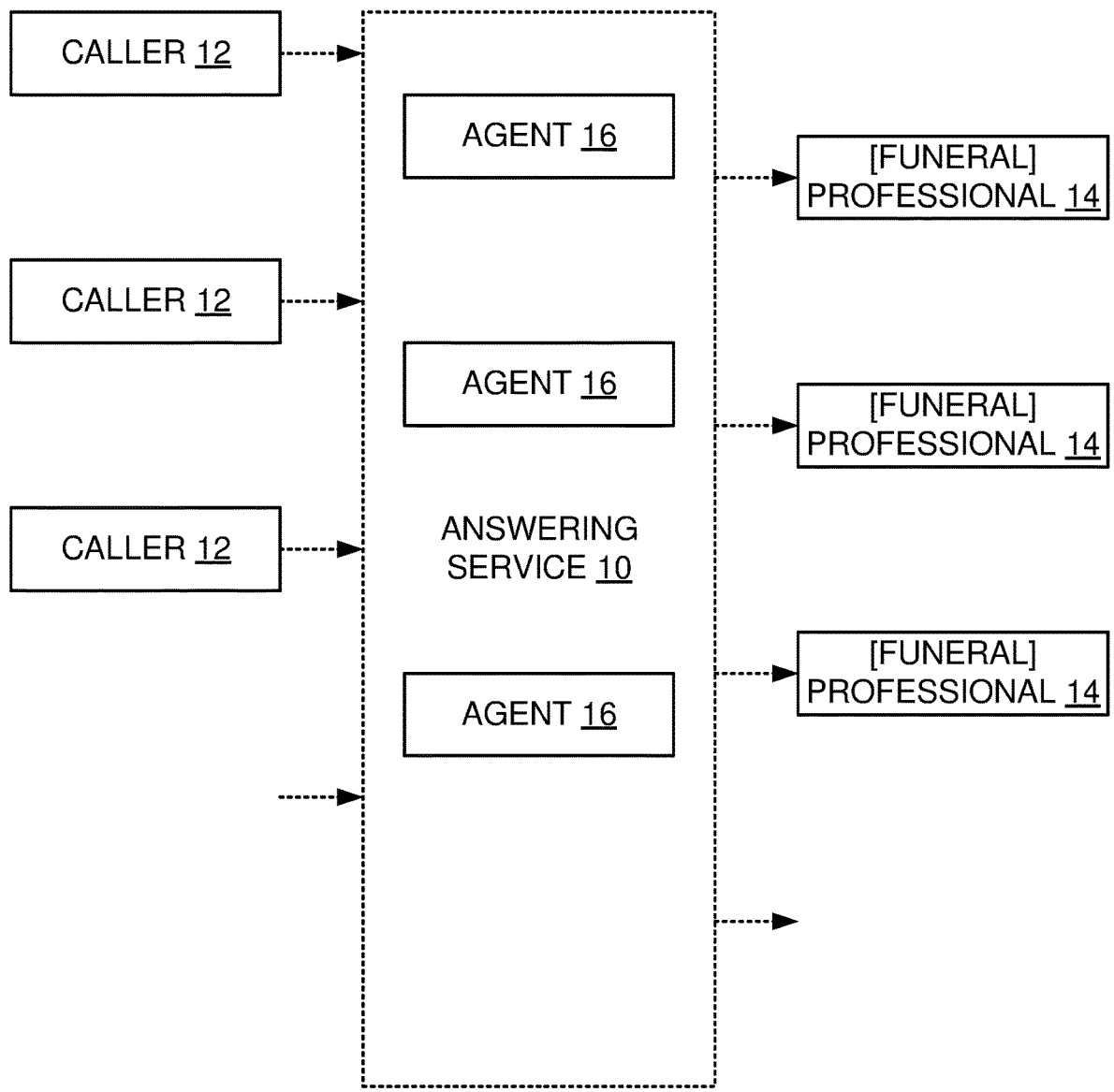
FIG. 2 is a block diagram showing a professional answering service provided to answer calls or the like from callers to professionals or the like in the event that the professionals are not willing or able to answer the calls.

Turning now to FIG. 2, it is seen that a professional answering service 10 is provided to answer each of one or more calls or the like from each of one or more callers 12 or the like to each of one or more professionals 14 or the like in the event that a particular professional 14 is not willing or able to answer a particular call from a particular caller 12. Typically, although not necessarily, the answering service 10 is operated by a business organization that provides answering services or the like on behalf of multiple professionals 14. As was alluded to above, each caller 12 and each professional 14 may be any appropriate respective caller and professional without departing from the spirit and scope of the present innovation. Thus, it may be that a particular professional 14 is a doctor, a lawyer, a service professional, a funeral director, or the like, among other things, and a particular caller 12 calling to the professional 14 may require the professional services thereof, perhaps on an urgent basis.

Likewise, the reason why the professional 14 does not answer a particular call may be most any reason without departing from the spirit and scope of the present innovation. For example, the professional 14 simply may not want to answer calls, such as for example if on a vacation or at a family event, among other things, or the professional 14 may be otherwise occupied by professional matters. With particular relevance to the present disclosure, it may be the case that the professional 14 works a regular schedule and is off duty, in which case the professional 14 may not wish to answer a call from a caller 12 under normal circumstances. Thus, and as was alluded to above, a doctor working during the day may not wish to be disturbed at night, except for emergencies, and a restaurant manager working evenings and weekends may not wish to be disturbed outside of such times unless necessary. In a similar manner, a funeral director may directly attend to funeral clients during normal business hours, but does not wish to do so after hours unless a funeral client is calling in an urgent manner.

In any event, and as should be understood, a call to a professional 14 is forwarded therefrom to the answering service 10 by appropriate means when the professional 14 is not available to answer such call or the like, and the answering service can perform a range of answering duties on behalf of the professional. As is generally known, such call forwarding and such answering duties are known or should be apparent to the relevant public and therefore need not be set forth herein in any detail other than that which is provided. As was alluded to above, such call forwarding in particular, may be effectuated on a per-call basis, such as for example if the professionally positively directs that a particular call be forwarded by way of a prearranged actuation procedure, or may be effectuated automatically for all calls, such as for example if the professional has activated automatic call forwarding for all calls by way of a prearranged enabling procedure.

Typically, although by no means necessarily, the automatic call forwarding is effectuated as a service to the professional by a provider providing telephone service to such professional, where such service provider may for example be a landline provider if the service is a landline telephone service or a mobile provider if the service is a mobile telephone service. In any instance, the automatic call forwarding may be activated and deactivated by the professional at will by way of appropriate activation/deactivation codes and/or procedures that are known or should be apparent to the relevant public and therefore need not be set forth herein in any detail other than that which is provided.

Upon answering a forwarded call on behalf of the professional 14, be it an automatically or manually forwarded call, the answering service 10 may let the caller 12 know when the professional 14 is scheduled to be available, or may collect information so that the professional 14 can return the call at an opportune time. Likewise, the answering service 10 may perform an assessment regarding the nature of the call and based thereon may perform a range of actions. Thus, the answering service 10 may determine that a relatively more serious matter requires more immediate action from the professional 14, in which case the answering service 10 may attempt to contact the professional 14 as soon as possible by appropriate means. Correspondingly, the answering service 10 may determine that a relatively less serious matter requires less immediate action from the professional 14, in which case the answering service 10 may only create a message for the professional to be collected thereby at a later time, or may attempt to service the matter directly, among other things.

As should be evident, upon a professional 14 or the like engaging an answering service 10 to answer calls therefor, the answering service 10 and/or the professional 14 may appropriately engage the aforementioned service provider to effectuate a call forwarding service for the professional 14 so that calls may be forwarded from the professional 14 to the answering service 10, particularly in a manner deemed necessary and/or advisable by such professional 14 and/or a business thereof. Such engaging and such forwarding services are generally known and need not be set forth herein in any detail other than that which is provided. Generally, the call forwarding may occur on any appropriate basis, including the time of day, whether automatic call forwarding has been positively activated or deactivated, whether the professional 14 has selected a particular call for forwarding, whether a call has rung a predetermined number of times, whether a phone or phone system of the professional 14 is off, or the like.

Figure 3:
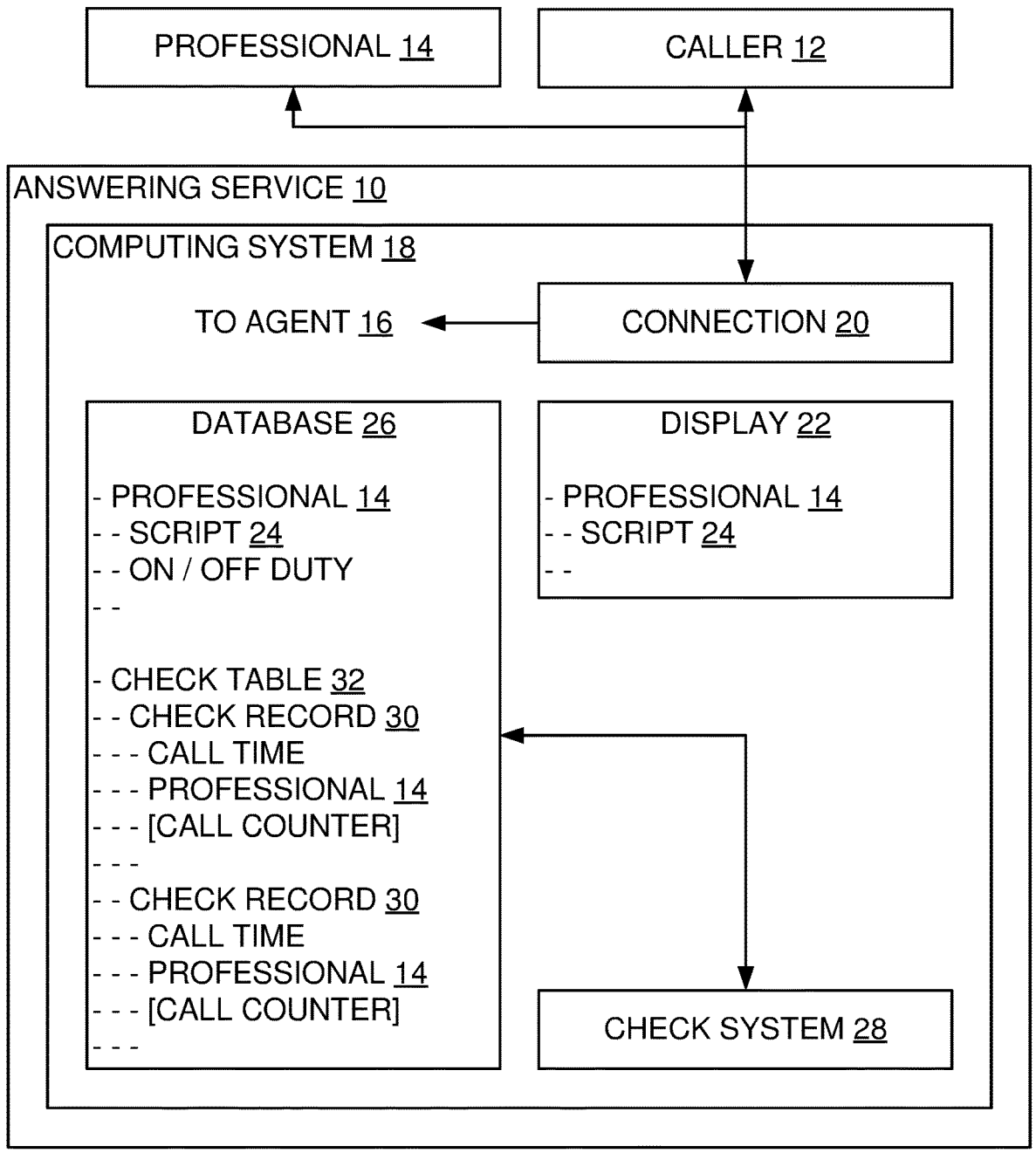
FIG. 3 is a block diagram of a computing system of the answering service employed to ensure that a professional of FIG. 2 activates call forwarding to the answering service in accordance with various embodiments of the present innovation.

Notably, an agent 16 or the like at the answering service 10 may answer a call on behalf of a particular professional 14. Presumptively, the agent 16 is one of a plurality of agents 16 at the answering service 10, and each of a plurality of calls from a caller 12 to a funeral professional 14 as forwarded to the answering service 10 is to be answered by one of the agents 16 associated with the answering service 10 with the use of a computing system 18 instantiated by or on behalf of the answering service 10. As seen in FIG. 3, the computing system 18 is in the nature of at least one of the computing device 100 on the top part of FIG. 1, and perhaps several of such computing devices 100 appropriately networked or otherwise interconnected. Here, it is to be appreciated that the computing system 18 may among other things include a connection 20 or the like for receiving each forwarded call from a caller 12, be it a voice call, a data call, a data message, a data conversation, or otherwise; a display 22 or the like for each agent 16 upon which is shown various items; and other computing peripherals which should be apparent to the relevant public. As may be appreciated, the connection 20 in particular may be in the nature of voice and/or data and/or video connections as may be appropriate. Thus, in the present innovation, a call may encompass most any form of communication capable between two parties, be it voice- and/or data- and/or video-based or otherwise, including but not limited to electronic mail, a chat conversation, push messaging, text messaging, video chatting, etc.

As may be appreciated, an agent 16 as appropriately interfaced to the computing system 18 of the answering service 10 by way of the display 22 thereof and other related equipment may answer a particular forwarded call from a caller 12 on behalf of a particular funeral professional 14 according to a predetermined procedure or 'script' 24 that has been established for the particular funeral professional 14 and stored in an appropriately configured local or remote database 26 (FIG. 3). As may be appreciated, the script 24 is shown to the agent 16 on the screen 22 thereof. As may also be appreciated, such database 26 may be any appropriately configured database without departing from the spirit and scope of the present innovation. Such a database 26 is generally known or should be apparent to the relevant public and therefore need not be set forth herein in any detail beyond that which is provided.

In general, and as was alluded to above, how a professional 14 and/or an answering service 10 thereof answers a call from a caller 12 is critical in creating a good impression of such professional 14 on such caller 12. If the caller 12 forms a bad impression based on how the call is answered, the caller 12 may also form a bad impression of the professional 14, and perhaps may choose to forego employing the same. Likewise, if the caller 12 forms a good impression based on how the call is answered, the caller 12 may also form a good impression of the professional 14, and perhaps may choose to in fact employ same. In the present context, an important factor in forming such good impression is whether the call is indeed forwarded to the answering service 10 and answered thereat when the professional 14 is unavailable.

Presumptively, the call to the professional 14 from the caller 12 is of a telephonic nature, at least for purposes of disclosing the present innovation in the present disclosure. Thus, it may be that the caller 12 is employing a landline telephone or a mobile telephone (a device 100 of FIG. 1, e.g.), and is calling to a landline telephone or mobile telephone of the professional 14 (also a device 100 of FIG. 1, e.g.). Notably, though, the call to the professional 14 from the caller 12 could be of some other nature without departing from the spirit and scope of the present innovation. For example, it may be that the caller 12 is employing a digital electronic mail device or a digital texting device (again, a device 100 of FIG. 1, e.g.), and is addressing a digital electronic mail device or a digital texting device (once again, a device 100 of FIG. 1, e.g.) of the professional 14. In any event, such call is forwarded to the answering service 10 by a mechanism appropriate to the nature of such call, where such mechanism is known or should be apparent to the relevant public and therefore need not be set forth herein in any detail other than that which is provided.

Funeral Professional

Although the professional 14 of the present innovation may be most any professional, it is to be appreciated that the present innovation has special relevance to funeral professionals 14, including not only funeral directors but also related professionals and services such as funeral homes, cremation services, crematory facilities, cemetery and memorial parks, casket and coffin companies, livery services, trade embalmers, funeral transport services, coroners, monument companies, burial vault companies, grief and bereavement counselors, body and tissue donation services, pet cremation, burial and cemetery services, and the like. Notably, such funeral professionals 14 share a common need for a heightened level of dignity, caring, and compassion in connection with the services provided thereby to a caller 12, as well as the services provided on their behalf to the caller 12 by the answering service 10.

Manual and Automatic Call Forwarding

As alluded to above, a professional 14 unable to answer a particular call from a caller 12 may manually actuate a procedure whereby the call is forwarded to the answering service 10 for answering thereat by an agent 16 thereof or the like. Such manual actuation is generally known or should be apparent to the relevant public, may generally involve pressing a button or the like on a device of the professional 14 or another appropriate procedure, and may occur for example when the professional 14 is busy with another call or with some other matter. As also alluded to above, a particular call from a caller 12 to a professional 14 may automatically be forward to the answering service 10 under certain circumstances, such as for example if the professional 14 is already communicating with another caller 12, or if the particular call goes unanswered after a period of time elapsed, etc.

In the context of the present innovation, however, a particular call from a caller 12 to a professional 14 is to be automatically forwarded to the answering service 10 because the professional has activated an automatic call forwarding service provided by a service provider or the like. In such automatic call forwarding service, and as should be appreciated, when the service is activated, each call for the professional 14 that would normally be received at one or more call-receiving devices (100 of FIG. 1) of the professional 14 is instead automatically forwarded to the answering service 10 for answering and processing thereat, without any action on the part of the professional 14, and typically although not necessarily without notifying the professional 14, at least initially.

Thus, with such automatic call forwarding, the call is forwarded to the answering service 10 for servicing thereat, and the professional 14 is not bothered by or otherwise notified of such call, unless servicing of such call by an agent 16 at the answering service 10 reveals that such bothering or notifying is warranted based on circumstances, perhaps. As a result, the professional 14 who is off duty or the like need not engage in the call, except perhaps if circumstances require such engagement. In general, such automatic call forwarding and how a call is received at an answering service 10 when such automatic call forwarding is activated are known or should be apparent to the relevant public, and therefore need not be set forth herein in any detail other than that which is provided.

As was alluded to above, a professional 14 is normally expected to manually activate automatic call forwarding of calls therefor to the answering service 10 for answering thereat. Such manual activation, which is generally known or should be apparent to the relevant public, typically requires that the professional 14 perform an enabling procedure, such as for example entry of an enabling code on a device (100 in FIG. 1) of the professional 14, or pressing of an enabling button on such a device, or enabling by way of a website, a computer application, an application on a mobile device, etc. Such manual activation also may require that the professional 14 enter a telephone number or the like to which calls are to be forwarded, which in the context of the present innovation should be a number of the like associated with the answering service 10. Customarily, the professional 14 performs such enabling procedure for manual activation of the automatic call forwarding when the professional 14 goes off duty or the like, and performs a corresponding disabling procedure for manual deactivation of the automatic call forwarding when the professional 14 goes back on duty or the like. Critically, though, a professional may at times simply forget to perform the enabling procedure in particular. In such case and in other similar cases, the result is that calls for the professional 14 are not in fact automatically forwarded to the answering service 10 for answering by agents 16 thereat, and opportunities to service callers 12 may be missed.

Ensuring Activation of Call Forwarding

Figure 4:
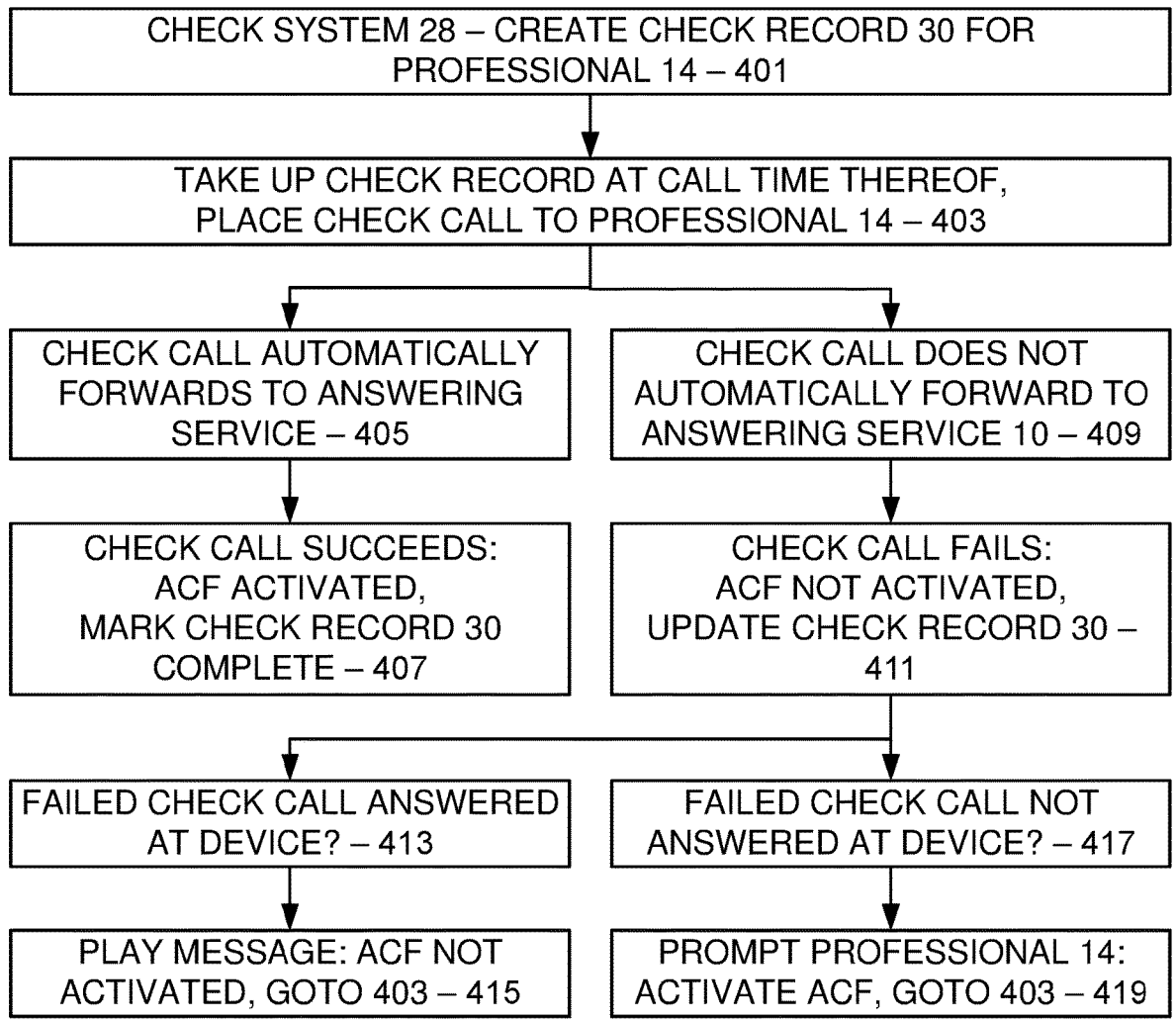
FIG. 4 is a flow diagram showing actions performed by the computing system of FIG. 3 in accordance with various embodiments of the present innovation.

Accordingly, and in various embodiments of the present innovation, and turning now to FIG. 4, a check system 28 (FIG. 3) and method are set forth for ensuring or at least attempting to ensure that call forwarding for a professional 14 or the like to the answering service 10 is activated, particularly after the normal business hours or the like of the professional 14. The check system 28 presumptively is a sub-system of the computing system 18 of FIG. 3 and thus has access to the database 26 of FIG. 3 or another database, for purposes which will be set forth in detail below.

Presumptively, the database 26 includes therein for each professional 14 information regarding the office hours thereof, and in particular when the professional 14 is expected to go on duty and off duty, or at least off duty. Thus, at some point with regard to a work day of the professional 14, the check system 28 creates a check record 30 for the professional 14 in the database 26 (401). Significantly, the check record 30 for the professional 14 includes a call time during that work day when the check system 28 is to effectuate a check call to a calling device of the professional 14 to establish whether the professional 14 has in fact activated call forwarding to the answering service 10 with regard to such calling device. In various embodiments, the call time may be when the professional is expected to go off duty according to the database 26. However, recognizing that the professional 14 might be afforded some leeway, such as for example if the professional 14 might leave a few minutes late, the call time may be padded, such as for example by adding a few minutes to a time when the professional 14 is expected to go off duty according to the database 26. Empirically, it has been found that good results are obtained when the call time is set to 15 minutes after the professional 14 is expected to go off duty, although other call times may also be employed without departing from the spirit and scope of the present innovation.

In various embodiments of the present innovation, and as shown in FIG. 3, the check system 28 creates a plurality of check records 30 with regard to a plurality of professionals 14 and stores the plurality of check records 30 in a check table 32 or the like in the database 26, although other forms of organizing the check records 30 may also be employed without departing from the spirit and scope of the present innovation. Notably, though, in such a check table 32 or the like, the check records 30 therein may be organized temporally and thus each check record 30 may be taken up serially according to the call time thereof.

In various embodiments of the present innovation, then, for each check record 30 in the check table 32, the check system 28 takes up same at the call time thereof and employs same to place a check call to the professional 14 associated therewith at a calling device associated therewith (403). Presumptively, the check call for the professional 14 should occur after such professional 14 has gone off duty and after such professional 14 has activated automatic call forwarding to the answering service 10 therefor with regard to the calling device thereof. However, and again, for a variety of reasons, the professional in fact may not have done so. For example, the professional 14 could be working late and therefore did not activate such automatic call forwarding, or the professional 14 could have simply forgotten to activate such automatic call forwarding, or the professional 14 during activation of automatic call forwarding could have entered a forwarding number other than that of the answering service 10, among other things.

In any event, if the professional 14 did indeed properly activate the automatic call forwarding to the answering service 10 with regard to the calling device thereof, the check call from the check system 28 to the device of the professional 14 should automatically forward to the answering service 10 according to the activated automatic call forwarding (ACF in FIG. 4) (405). At such answering service 10, then, the check call is recognized as succeeding, and the check record 30 can be marked as complete or the like (407). Presumptively, the check system 28 recognizes that the check call succeeded by way of an appropriate mechanism. Also presumptively, the check system 28 marks the check record 30 as complete by way of another appropriate mechanism. Such appropriate mechanisms are known or should be apparent to the relevant public and therefore need not be set forth herein in any detail other than that which is provided. For example, the check system 28 may recognize the forwarded check call from a Caller ID or other signaling information associated therewith corresponding to the professional 14. Alternately, an audible (tone) pattern could be played on the calling side of the check call, or possibly on the called side of the check call upon answering said check call while knowing a check call is in progress, where the audible tone pattern upon being heard in turn recognizes the forwarded check call. Based on the recognized check call, then, the check system 28 would declare the forwarded check call as succeeding, and appropriately terminate the successful check call. Likewise, based on the successful check call, the check system 28 may mark the corresponding check record 30 as complete by marking such check record 30 as successful or even by the simple expedient of removing same from the check table 32.

However, if the professional 14 did not in fact activate the automatic call forwarding to the answering service 10 with regard to the calling device thereof, or if the professional 14 improperly activated the automatic call forwarding to the answering service 10 with regard to the calling device thereof, the check call from the check system 28 to the device of the professional 14 does not automatically forward to the answering service 10 (409). At such answering service 10, then, the check call is recognized as failing, and the check record 30 is updated to reflect same (411). Presumptively, the check system 28 recognizes that the check call failed by way of an appropriate mechanism. Also presumptively, the check system 28 updates the check record 30 by way of another appropriate mechanism. Such appropriate mechanisms are known or should be apparent to the relevant public and therefore need not be set forth herein in any detail other than that which is provided.

For example, the check system 28 may recognize that the check call failed by the lack of receipt of an incoming call at the answering service 10 with a Caller ID or other signaling information associated therewith corresponding to the professional 14 and based thereon declare the forwarded check call as failing. Also, and significantly, if the failed check call is in fact answered at the device (413), presumptively by the professional 14 or an associate thereof, the check system 28 may play a recorded message thereto to the effect that such professional 14 has not as yet activated automatic call forwarding (415). Notably, the recorded message may be relatively simple, to the effect that the check call failed and the professional 14 should take appropriate action, or may be relatively more complex and even interactive to allow the professional 14 options for responding. Such options for responding may for example include allowing the professional 14 to speak with an agent 16 at the answering service 10, or allowing the professional to reset the call time for the corresponding check record 30 within the check table 32 to a later time, or the like.

Likewise, based on the failed check call, and regardless of whether the failed check call is in fact answered at the device of the professional 14, the check system 28 may itself update the corresponding check record 30 within the check table 32 by the simple expedient of resetting the call time thereof to a later time. As should be appreciated, by resetting the call time of the check call to a later time, such check call will be repeated at the later time as at 403 et seq.

If the failed check call is not answered at the device, it can only be speculated as to why call forwarding was not activated, and why no one is available at the device to explain. Typically, although not necessarily, the work site of the professional 14 is now closed, such professional 14 has left the work site, and yet somehow such professional 14 has forgotten to activate call forwarding for the device. Regardless of why, when the failed check call is not in fact answered at the device (417), and in various embodiments of the present innovation, the check system 28 may take one or more appropriate actions in order to prompt the professional 14 to activate the automatic call forwarding, or at least to acknowledge that such non-activation is intended (419). Such appropriate actions may be any appropriate actions without departing from the spirit and scope of the present innovation.

Presently, such appropriate actions as at 419 are expected to be in the nature of a message or other form of attempted contact with the professional 14. In particular, it may be that the check system 28 automatically messages the professional 14, perhaps by way of a mobile text, an email message, a pushed notification message, an automated tasking service message, etc. Such messaging by the check system 28 would presumptively be in the nature of a warning or alert that the call forwarding for the device is not activated, and an invitation to so activate. In addition or in the alternative, the messaging may invite the professional to respond in one or more manners, such as for example that further check calls are to be canceled, or that another check call is to be placed as at 403 after a selected delay of time. In either case, the corresponding check record 30 is appropriately updated as at 411.

The check record 30 corresponding to a particular professional 14 may include a call counter that is incremented each time the check system 28 registers a failed check call for such professional 14. Accordingly, and in various embodiments of the present innovation, one or more heightened action as at 419 may be initiated if the call counter of a check record 30 exceeds one or more corresponding predetermined values. For example, if the call counter of a check record 30 shows 2 failed check calls to the corresponding professional 14 as at 411, an agent 16 may manually attempt to contact the professional 14, and after 4 failed check calls as at 411, the agent 16 may manually attempt to contact a supervisor or an emergency contact of the professional 14.

In some instances, call forwarding as instantiated at a device of a professional 14 includes a built-in delay before an incoming call to the device is in fact forwarded. As may be appreciated, such delay may for example allow the professional 14 a short period of time in which to answer the incoming call before same is forwarded, among other things. If in fact call forwarding as instantiated at a device of a professional 14 does include such a built-in delay, such delay should be taken into consideration by the check system 28. In particular, such check system 28 should allow a check call to pend for at least such built-in delay before deciding whether such check call fails as at 411. Accordingly, and as should be understood, the check call is given an appropriate amount of time to be at least potentially forwarded to the check system 28 at the answering service 10.

As may be appreciated, call forwarding as provided to a professional 14 by the service provider thereof may include support for multiple simultaneous call forwards, which is sometimes referred to as "Multi-Channel Call Forwarding" or MCCF. As should be understood, the supported MCCF allows multiple calls to be routed to a call forwarding destination simultaneously. However, if MCCF is not in fact supported by a call forwarding service provider or the like, congestion can occur, wherein the simultaneously forwarded calls essentially result in a 'busy signal' indicator being received at the check system 28/computing system 18/answering service 10. Such busy signal as a check call outcome is indeterminate in that the busy signal does not definitively mean anything to the check system 28, so the check system 28 may interpret the busy signal to mean that a corresponding check call failed.

If indeed congestion occurs because MCCF is not provided to the professional 14, or is provided but is not opted into by the professional 14 as part of the call forwarding service thereof, such professional 14 is at risk of missing opportunities for business or the like, specifically when a check call thereto is interpreted as failing and as a result the call forwarding thereof is not activated. In various embodiments of the present innovation, then, a check call that fails is presumed to be the result of congestion, and another check call is automatically rescheduled for a programmable time in the near future, perhaps on the order of 4 or 5 minutes after such fail. Moreover, if the fail (again presumably due to congestion) recurs a number N of times in a row, the check system 28 of the present innovation may conclude that a true failure has occurred, in which case such check system 28 may then proceed with an appropriate heightened response.

Note that in various embodiments of the present innovation, the check system 28 may determine whether MCCF is in place for a professional 14 by placing two or more simultaneous check calls thereto. As should be appreciated, with MCCF in place and activated, the two or more simultaneous check calls should all be forwarded or not forwarded back to the check system 28 as at 405, 409, but one simultaneous check call should not fail if another succeeds. Thus, if at least one of the simultaneous check calls fails and at least one of the simultaneous check calls does not fail, it may be presumed that MCCF is not in place and activated for the professional 14, in which case the professional 14 is notified of same by an appropriate alert, such as a text message, an electronic mail message, email, a push message etc.

Notably, the present innovation has thus far been set forth in terms of ensuring that automatic call forwarding is activated when a professional 14 goes off duty. However, the relevant public should appreciate that the present innovation could also be employed to ensure that automatic call forwarding is deactivated when a professional 14 goes on duty, with appropriate modifications. Such appropriate modifications should be apparent to the relevant public based on the present disclosure, and therefore need not be set forth herein in any detail other than that which is provided. Generally, in the context of ensuring deactivation, a check system 28 creates a check record 30 for the professional 14 in a database 26 as at 401, but the check record 30 for the professional 14 includes a call time during that work day when the check system 28 is to effectuate a check call to a calling device of the professional 14 to establish whether the professional 14 has in fact deactivated call forwarding to the answering service 10 with regard to such calling device. In such deactivation context, the remaining actions play out similarly as compared with the activation context of FIG. 4 except where required.

CONCLUSION

The programming believed necessary to effectuate the processes performed by the computing system 18 and check system 28 in connection with the various embodiments of the present innovation is relatively straight-forward and should be apparent to the relevant programming public based on the present disclosure. Accordingly, such programming is not attached hereto. Any particular programming, then, may be employed to effectuate the various embodiments of the present innovation without departing from the spirit and scope thereof.

In the present innovation, a system and method are set forth for ensuring automatic activation of call forwarding from a professional 14 or the like to an answering service 10 or the like. The answering service 10 tests whether such call forwarding is activated and attempts to contact the professional 14 when such call forwarding is not in fact activated. Such answering service 10 can repeatedly attempt to contact the professional 14 until the call forwarding is activated or the professional positively dismisses such attempts.

It should be appreciated that changes could be made to the embodiments described above without departing from the innovative concepts thereof. For example, although the present innovation is set forth primarily in terms of a funeral business or the like, such innovation may also be practiced by any other appropriate type of business or called party that employs an answering service 10 for callers 12 or other parties. Likewise, although the present innovation is set forth primarily in terms of an answering service or the like, such innovation may also be practiced by any other appropriate type of business or service, whether acting in an intermediary capacity or otherwise. Moreover, although the present innovation is set forth primarily in terms of telephonic calls or the like from callers 12 and/or chats initiated by callers 12 and/or the like, such innovation may also be practiced in connection with any other appropriate type of communications medium and other types of interested parties, perhaps with suitable modification. Likewise, although the present innovation is set forth with reference to the use of particular elements, systems, and sub-systems, such particular manufactures need not necessarily be employed, or may be employed with suitable modification. Significantly, although the present innovation is disclosed primarily within the contextual reference of a call forwarding service, such service should be interpreted broadly and without limitation to other forms of call services and the like for which activation and/or deactivation may be ensured. It should be understood, therefore, that this innovation is not limited to the particular embodiments disclosed, but it is intended to cover modifications within the spirit and scope of the present innovation as defined by the appended claims.

The invention claimed is:

1. A method performed by an answering service, the answering service for answering a call to a called party unable or unwilling to answer the call directly, the call being forwarded to the answering service by way of a call forwarding service of the called party (hereinafter, 'call forwarding'), the called party normally being expected to activate call forwarding when the called party goes off duty, the method for at least attempting to ensure that call forwarding is activated after the called party goes off duty, the method being performed by a computing system of the answering service and comprising:

determining with reference to a database when the called party goes off duty, and creating a check record for the called party in the database, the check record including a call time at which to effectuate a check call to a calling device of the called party to establish whether the called party has in fact activated call forwarding to the answering service with regard to such calling device, the call time in the call record corresponding to when the called party goes off duty;

taking up the call record from the database at the call time thereof and employing same to place the check call to the called party at the calling device thereof, the placed check call presumptively occurring after the called party has gone off duty and after such called party has activated call forwarding with regard to the calling device; and determining whether the check call to the device automatically forwarded to the answering service, if the check call did automatically forward to the answering service:

concluding that the check call succeeded and that the called party in fact activated call forwarding; and marking the check record as completed, if the check call did not automatically forward to the answering service: concluding that the check call failed and that the called party did not in fact activate call forwarding;

updating the check record;

sending an electronic message to the called party that call forwarding is not activated; and inviting the called party to respond that a further check call is not to be made.

2. The method of claim 1 wherein the call time is padded to a time after the called party is expected to go off duty.

3. The method of claim 1 comprising creating a plurality of check records for a plurality of called parties in the database, storing the plurality of check records in a check table in the database, and organizing the check records temporally within the check table, the method further comprising taking up each check record from the check table according to the call time thereof.

4. The method of claim 1 wherein marking the check record as completed comprises removing same from the check table.

5. The method of claim 1 wherein determining whether the check call to the device automatically forwarded to the answering service comprising recognizing the forwarded check call from a Caller ID or other signaling information associated therewith.

6. The method of claim 1 wherein the check call did not automatically forward to the answering service, the method further comprising determining that the called party did not in fact activate call forwarding from a lack of receipt of the check call at the answering service.

7. The method of claim 1 wherein the check call did not automatically forward to the answering service, the method comprising determining that the called party did not in fact activate call forwarding from the called party in fact answering the check call, and in response thereto playing a recorded message thereto to the effect that such called party has not as yet activated call forwarding.

8. The method of claim 1 wherein the check call did not automatically forward to the answering service, the method comprising determining that the called party did not in fact activate call forwarding from the called party in fact answering the check call, and in response thereto playing a recorded message thereto to the effect that such called party has not as yet activated call forwarding, the recorded message providing options for responding, receiving a selection of one of the options from the called party, and updating the check record accordingly.

9. The method of claim 1 wherein the check call did not automatically forward to the answering service, the method comprising determining that the called party did not in fact activate call forwarding from the called party in fact answering the check call, and in response thereto playing a recorded message thereto to the effect that such called party has not as yet activated call forwarding, the recorded message providing options for responding, receiving a selection of one of the options from the called party, and updating the check record accordingly, the options including allowing the called party to speak with an agent at the answering service.

10. The method of claim 1 wherein the check call did not automatically forward to the answering service, the method comprising determining that the called party did not in fact activate call forwarding from the called party in fact answering the check call, and in response thereto playing a recorded message thereto to the effect that such called party has not as yet activated call forwarding, the recorded message providing options for responding, receiving a selection of one of the options from the called party, and updating the check record accordingly, the options including allowing the called party to reset the call time of the check record within the check table to a later time.

11. The method of claim 1 wherein if the check call did not automatically forward to the answering service, updating the check record by resetting the call time thereof to a later time so that the check call is repeated at the later time.

12. The method of claim 1 further comprising, if the check call did not automatically forward to the answering service, prompting the called party to activate the call forwarding, or at least to acknowledge that such non-activation is intended.

13. The method of claim 1 further comprising, if the check call did not automatically forward to the answering service, sending an electronic message to the called party that call forwarding is not activated.

14. The method of claim 1 further comprising, if the check call did not automatically forward to the answering service, sending an electronic message to the called party that call forwarding is not activated and inviting the called party to respond that a further check call is to be made after a selected delay of time.

15. The method of claim 1 wherein the check record in the database includes a call counter for being incremented each time a check call to the called party fails, the method comprising, if the check call did not automatically forward to the answering service, updating the check record by resetting the call time thereof to a later time so that the check call is repeated at the later time, and incrementing the call counter in the check record.

16. The method of claim 1 wherein the check record in the database includes a call counter for being incremented each time a check call to the called party fails, the method comprising, if the check call did not automatically forward to the answering service, updating the check record by resetting the call time thereof to a later time so that the check call is repeated at the later time, and incrementing the call counter in the check record, the method further comprising reviewing the call counter of the check record and taking a heightened action if the call counter exceeds a predetermined number.

17. The method of claim 1 wherein the check record in the database includes a call counter for being incremented each time a check call to the called party fails, the method comprising, if the check call did not automatically forward to the answering service, updating the check record by resetting the call time thereof to a later time so that the check call is repeated at the later time, and incrementing the call counter in the check record, the method further comprising reviewing the call counter of the check record and taking a heightened action if the call counter exceeds a predetermined number, the heightened action comprising prompting an agent at the answering service to manually attempt to contact the called party.

18. The method of claim 1 wherein the check record in the database includes a call counter for being incremented each time a check call to the called party fails, the method comprising, if the check call did not automatically forward to the answering service, updating the check record by resetting the call time thereof to a later time so that the check call is repeated at the later time, and incrementing the call counter in the check record, the method further comprising reviewing the call counter of the check record and taking a heightened action if the call counter exceeds a predetermined number, the heightened action comprising prompting an agent at the answering service to manually attempt to contact a supervisor or an emergency contact of the called party.

19. The method of claim 1 wherein the activated call forwarding of the called party includes a built-in delay before a call to a called party is in fact forwarded, the method comprising allowing the check call to pend for at least such built-in delay before determining whether the check call to the device automatically forwarded to the answering service.

* * * * *